Oct. 13, 1936.    F. W. GUIBERT    2,057,333
LIQUID MEASURING DEVICE
Filed June 5, 1934    6 Sheets-Sheet 2
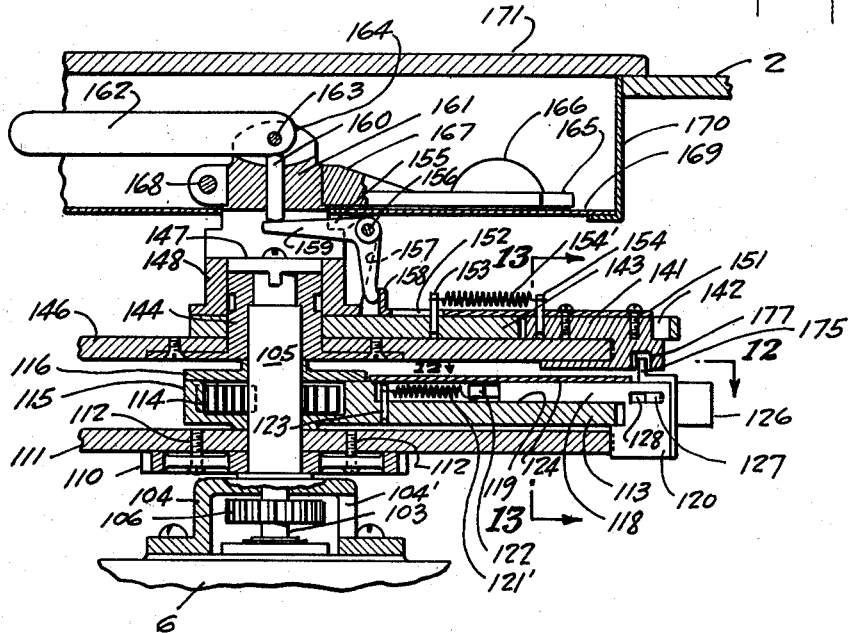
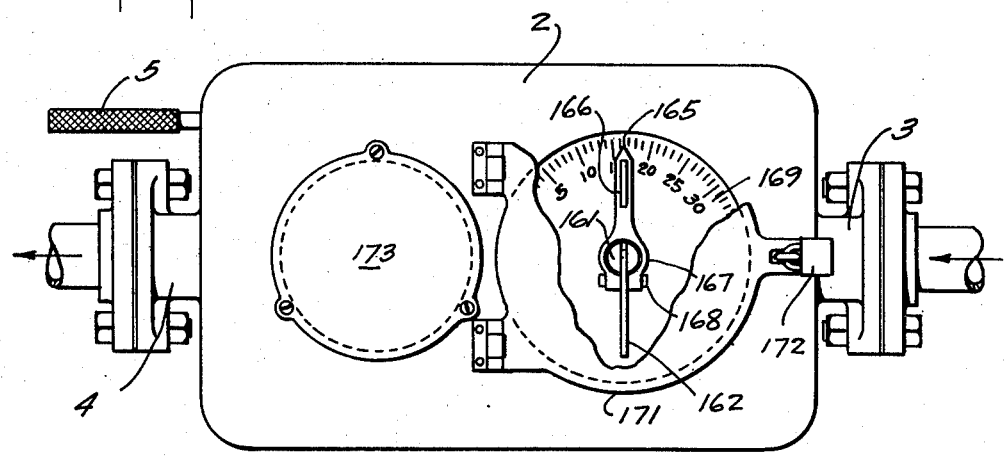
INVENTOR
Francis Walter Guibert
BY John Flam
ATTORNEY

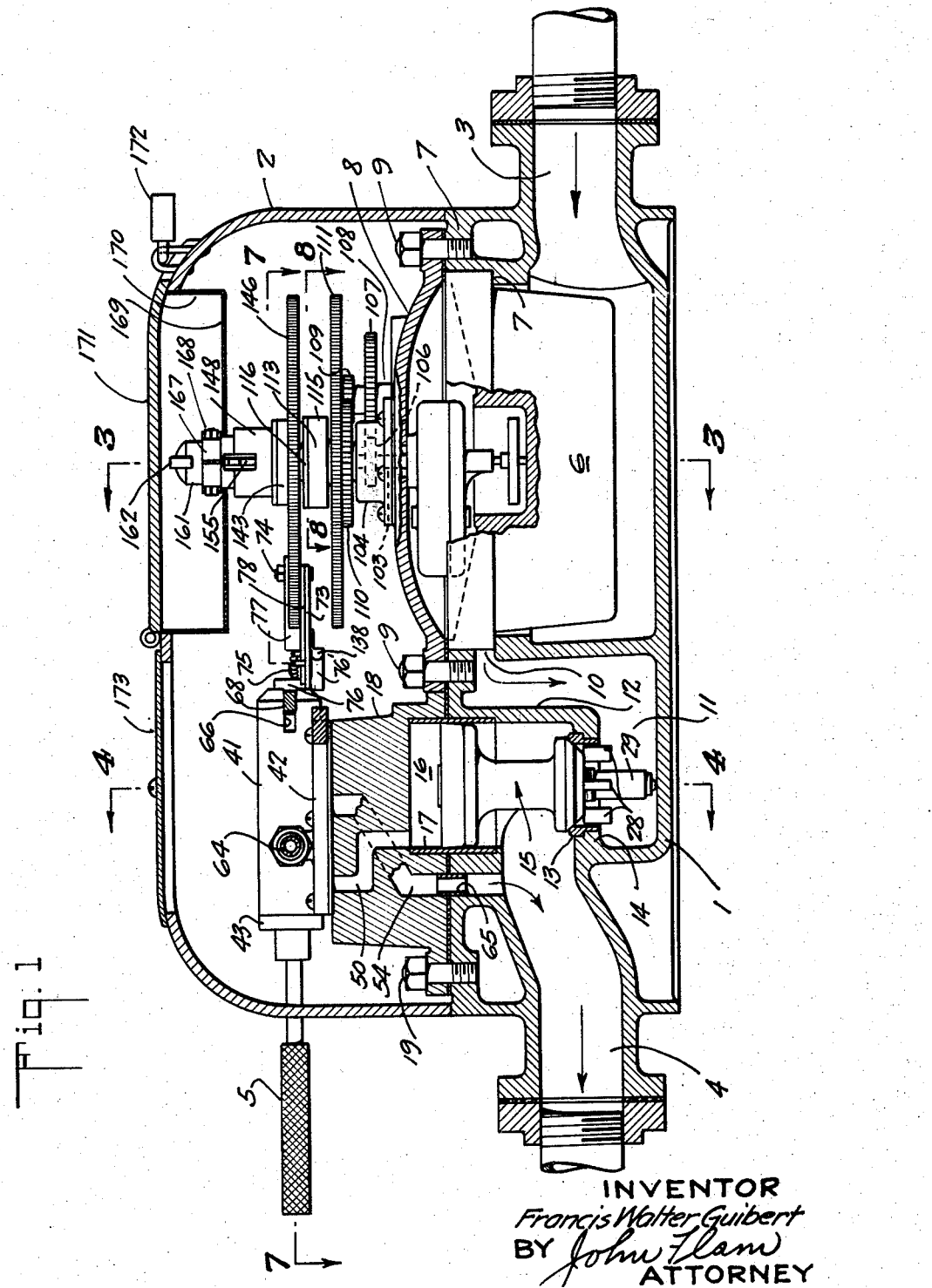

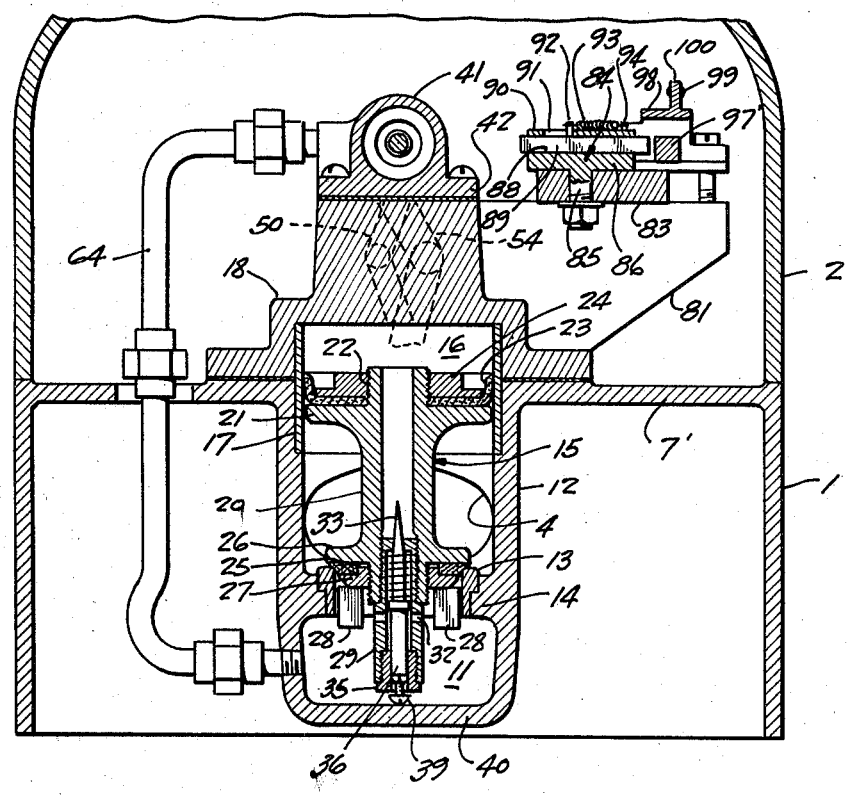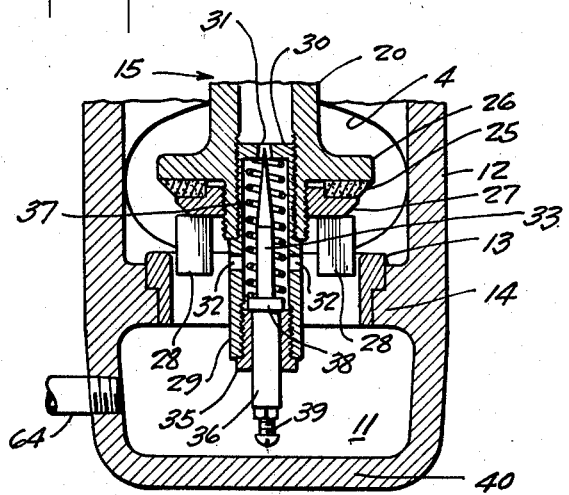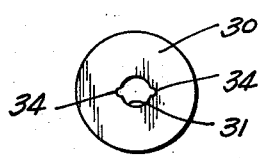

Oct. 13, 1936.   F. W. GUIBERT   2,057,333
LIQUID MEASURING DEVICE
Filed June 5, 1934   6 Sheets-Sheet 4

INVENTOR
Francis Walter Guibert
BY John Flam
ATTORNEY

Oct. 13, 1936.  F. W. GUIBERT  2,057,333
LIQUID MEASURING DEVICE
Filed June 5, 1934  6 Sheets-Sheet 5
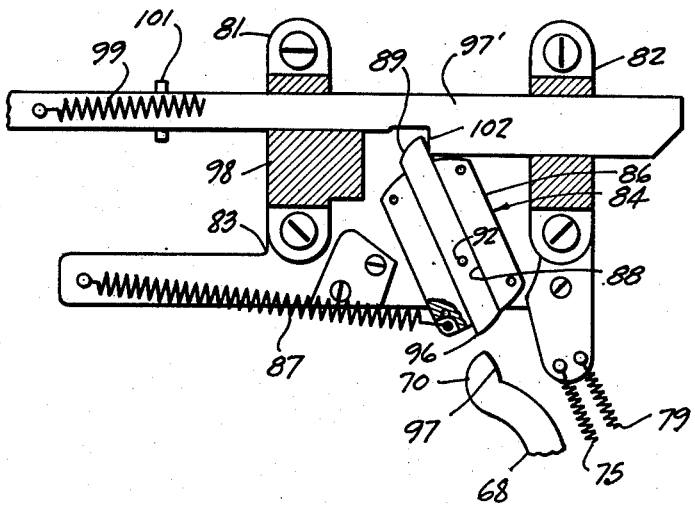
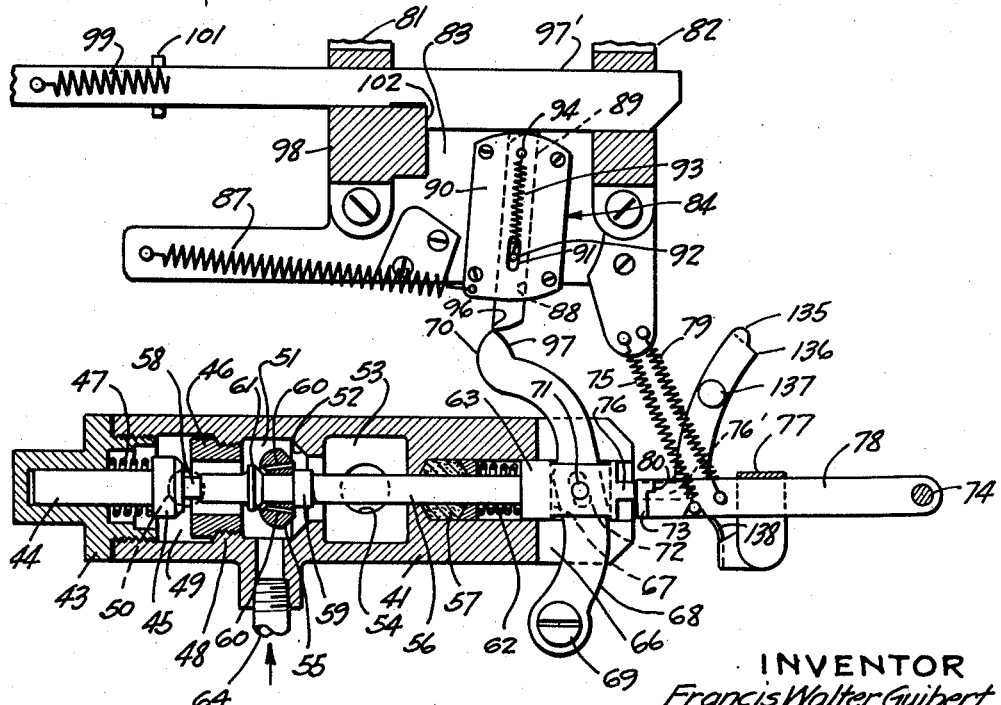
INVENTOR
Francis Walter Guibert
BY John Flam
ATTORNEY

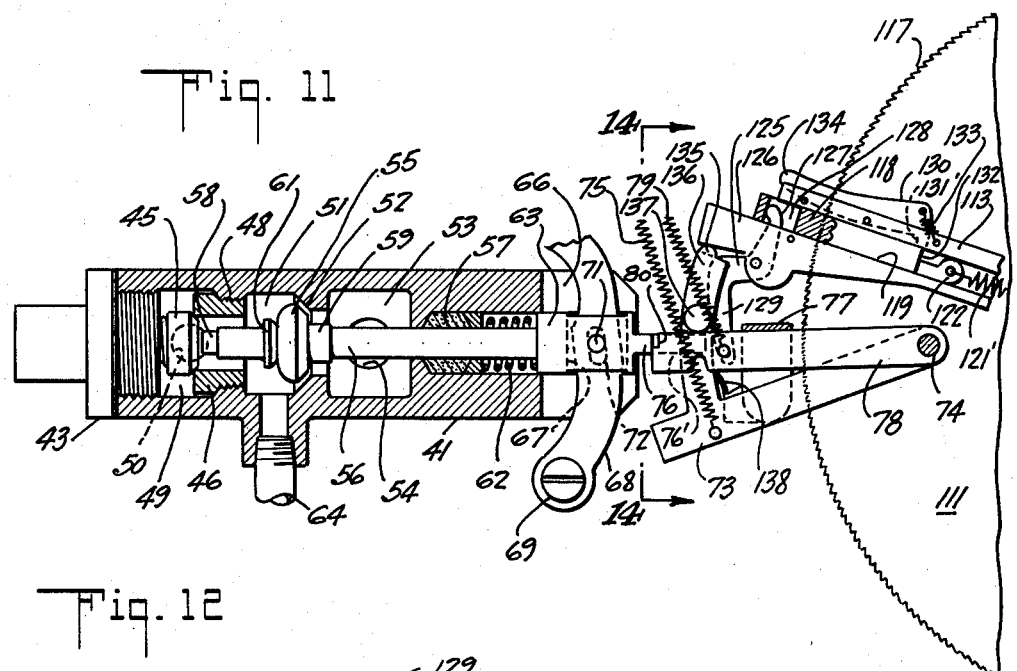
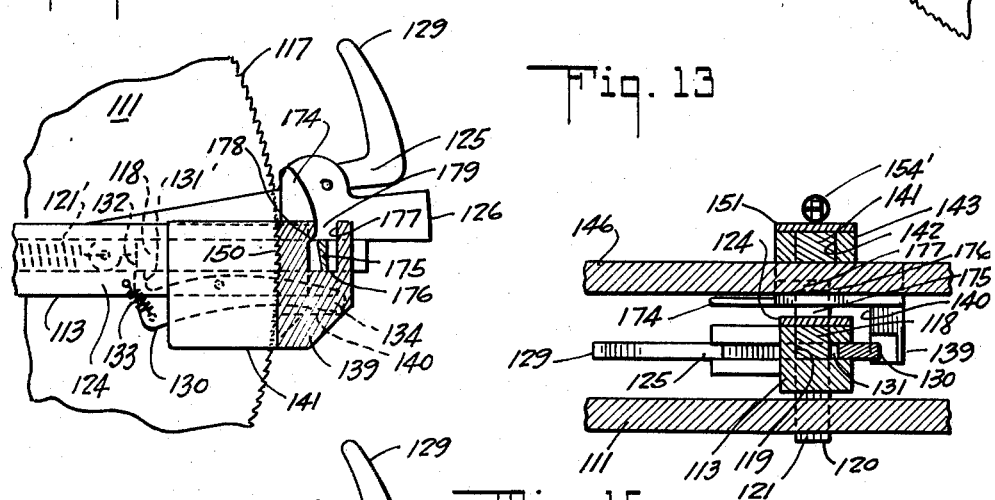
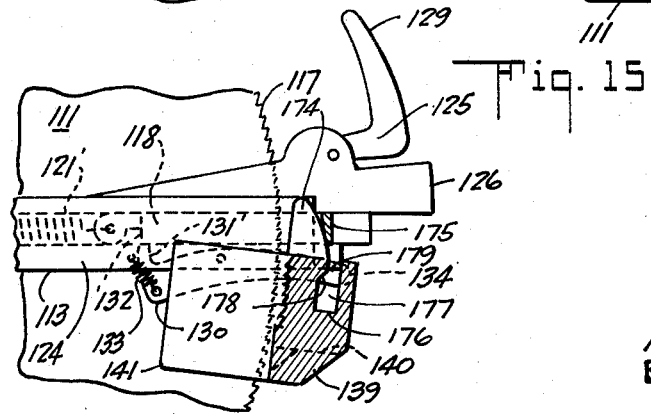

Patented Oct. 13, 1936

2,057,333

UNITED STATES PATENT OFFICE 2,057,333

LIQUID MEASURING DEVICE

Francis Walter Guibert, Beverly Hills, Calif.

Application June 5, 1934, Serial No. 729,102

34 Claims. (Cl. 221—101)

This invention relates to a measuring device, for delivering, through a conduit, measured quantities of a liquid, such as oil, gasoline, water, and the like.

In the patent to Crosby, owned by this applicant, No. 1,918,828, issued July 25, 1933, for a Liquid measuring system, a device of this character is illustrated. In general it is one of the objects of this invention to provide a modified form of such a meter, in order to enable the meter to operate more accurately and repeatedly in a thoroughly reliable fashion.

In measuring devices as shown in the Crosby patent, the operation is such that it can be made to deliver any number of successive measured batches of liquid in uniform amounts, by merely manipulating a member, such as a lever or handle, for each batch to be delivered. With the aid of the present invention, it is assured that each measuring and delivery operation must be completed before a succeeding batch can be started. In other words, it is impossible to initiate a new cycle of operations until one cycle is completed.

This feature is of considerable importance for example where measured quantities of water are to be delivered for a concrete mixture. In such work, the quantity of water delivered must be quite accurately fixed, in order to secure optimum results. If the operator can initiate a new cycle after a small amount of water is delivered in one cycle, a batch of liquid corresponding to the new cycle can be added to the amount already delivered. In this way, the operator could increase the amount of the batch by any desired quantity, in spite of the instructions to use only a single batch of water for each mix.

With the aid of the present invention, only full batches in succession can be delivered. Although the operator might multiply his batches for a single mix and thus violate his orders, yet an increase of the batch by a complete supplemental measured batch would make his mix so fluid as to be immediately detected as wrong, and his violation of orders would become immediately apparent.

It is another object of this invention to ensure accuracy in the measured batches.

It is still another object of this invention to make it possible to close the valve through which the liquid is delivered, without causing injurious water-hammer; and even when the pressure in the supply mains is quite high, such as one hundred or one hundred and fifty pounds per square inch.

It is still another object of this invention to maintain the accuracy and the calibration of the device irrespective of major variations of liquid pressure in the supply.

These results are accomplished by the use of a pilot valve of specific construction, for controlling the main valve. This pilot valve is so arranged that, near the time the cycle is completed, the liquid delivery passage is closed in a number of steps, and not rapidly closed from a fully open position. In this way, a graded diminution in the rate of flow is effected, which improves accuracy and eliminates harmful water-hammer, without the need of pressure regulators.

As a further guard against water-hammer or percussion, there is added a supplemental valve operable when the main valve is closing, to decrease the rate of flow therethrough in a gradual manner.

This invention possesses many other advantages, and has other objects which may be made more easily apparent from a consideration of several embodiments of the invention. For this purpose there are shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings:

Figure 1 is a longitudinal sectional view of a device incorporating the invention;

Fig. 2 is a top plan view thereof, a part of the cover being broken away;

Fig. 3 is an enlarged fragmentary sectional view taken along the plane 3—3 of Fig. 1;

Fig. 4 is an enlarged fragmentary sectional view taken along plane 4—4 of Fig. 1;

Fig. 5 is a sectional view corresponding to Fig. 4 but showing the main valve at open position;

Fig. 6 is a detail plan view of a portion of the mechanism shown in Fig. 5;

Fig. 9 is an enlarged detail view of the apparatus for initiating the operation of the device;

Fig. 10 is a view similar to Fig. 9 but showing a different stage of operation of the apparatus;

Fig. 11 is a view mainly in section showing the manner in which the closing of the valve is controlled;

Fig. 12 is an enlarged detail view taken along plane 12—12 of Fig. 3;

Fig. 13 is an enlarged detail view taken along the plane 13—13 of Fig. 3;

Fig. 15 is a view similar to Fig. 12 but illustrating one stage in the operation of the mechanism for setting of the device to deliver a definite amount of liquid.

Figure 7:
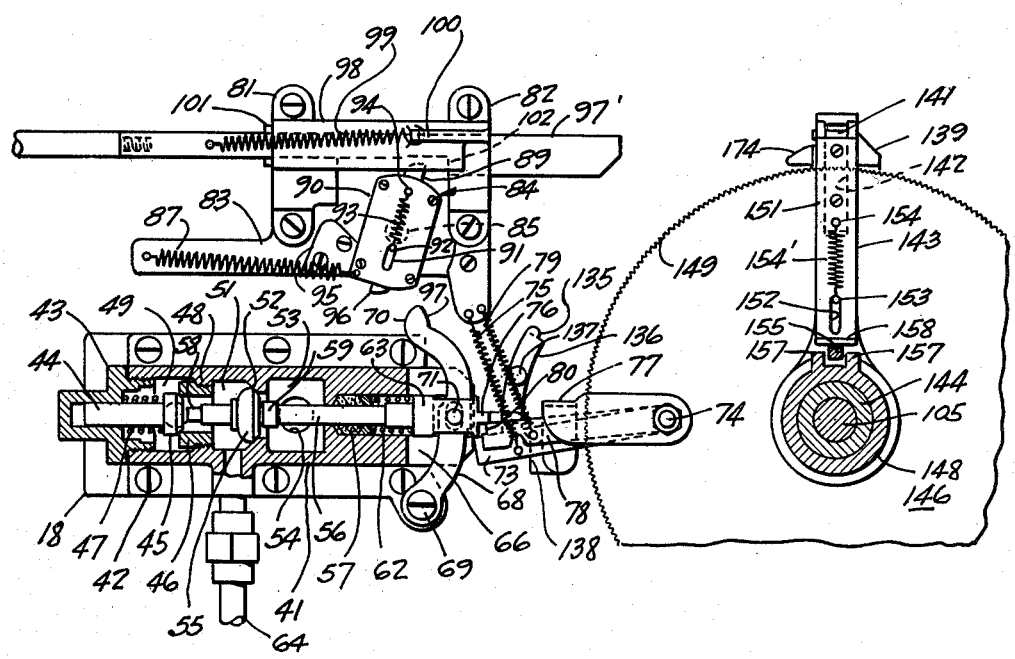
Fig. 7 is a sectional view taken along plane 7—7 of Fig. 1.

The device includes a casing formed of a base portion 1 and a cover 2 appropriately fastened together (Figs. 1, 2, 3 and 4). As shown most clearly in Figs. 1 and 2, the base portion 1 has an inlet conduit connection 3 and an outlet conduit connection 4. Conduit 3 is connected to a source of liquid such as the water mains of a water supply system; and conduit 4 is adapted to discharge the measured quantity of water or other liquid to the place where it is to be used, for example, into a concrete mix.

The apparatus is adapted to be operated to deliver in succession, measured quantities of liquid as by the manipulation of a pull handle 5 (Figs. 1 and 2). Once the handle 5 is pulled, the mechanism must operate through a complete cycle for delivering a predetermined amount of liquid through a metering device such as a liquid flow meter 6 (Figs. 1 and 3). This flow meter is accommodated in the base portion 1. It is held in place on an annular shoulder 7 formed in the base portion 1 and its cover 8 is adapted to be secured, as by the aid of bolts 9, to a flange 7' adjacent the top of the base portion 1.

The liquid entering into inlet conduit 3 passes through the metering mechanism, and thence through a meter outlet passage 10 and downwardly into a chamber 11 (Figs. 1, 4 and 5). The mechanism as shown in Figs. 1, 3 and 4 is inactive; that is, the valves to be hereinafter described are closed, preventing passage of water from chamber 11 to the outlet conduit 4.

There will now be described the valves which control the passage of liquid from the chamber 11 to the conduit 4. There is a main valve structure shown most clearly in Figs. 1, 4 and 5. In Figs. 1 and 4 the main valve is closed and in Fig. 5 the main valve is shown in its completely open position.

This main valve includes a circular housing 12 having a valve seat 13 supported in a flange 14 inside of the housing. This flange 14 is placed intermediate the chamber 11 and conduit 4. The housing 12 forms virtually a cylinder for a piston valve closure structure 15. In the position shown in Figs. 1 and 4, this piston valve structure is shown in closed position; and in Fig. 5 it is shown in open position. The cylinder chamber 16 is shown as disposed above the structure 15. It is formed by the aid of an insert bushing 17 and a cap member 18 which can be fastened to the flange 7' as by bolts 19. Appropriate gaskets can be provided between member 18 and flange 7' to make the cylinder chamber 16 fluid tight.

Fluid pressure in chamber 16 is adapted to urge structure 15 downwardly in order to close the valve. The structure 15 includes a central stem 20 and an upper flange 21. The upper end of the stem 20 can be threaded as shown at 22 whereby it is possible to clamp a cup leather 23 between flange 21 and a threaded clamp nut 24.

The valve closure proper is indicated by a reference character 25 (Fig. 5) which may be made of leather or yieldable material and held against the lower flange 26 of the stem 20 as by the aid of the threaded member 27. This member 27 carries a number of downwardly extending guide vanes 28, entering into the valve seat ring 13.

To hold valve closure 15 in closed position, it is of course necessary to exert a fluid pressure downwardly upon the structure 15. The fluid pressure of the source of supply can be utilized for this purpose. Thus from chamber 11, fluid from the source can pass through the hollow stem 20 into the chamber 16 by way of passages formed in a manner now to be described. The structure 15 carries a tubular extension 29. This extension 29 is threadedly engaged inside of the hollow stem 20 and has a top 30 having a tapered central aperture 31 therein. The bore of member 29 is in communication with chamber 11 by way of a plurality of radial passageways 32 so that liquid can pass through these passageways and upwardly through member 29 and stem 20 into chamber 16.

Although aperture 31 is shown as controlled by a needle valve stem 33, yet it is never completely closed because there are several bleeder passageways 34 (Fig. 6) that are formed as transverse slots to the main passageway 31. Accordingly, if cylinder space 16 is not vented, fluid pressure is available at all times through these passageways 34 for urging the main valve to closed position.

By the aid of the needle valve mechanism it is assured that the valve closure structure 15 does not close too suddenly. During the initial closing movement the needle valve stem 33 is in the open position as shown in Fig. 5, and fluid pressure is fully effective to urge structure 15 downwardly. However, upon continued downward movement of structure 15, the needle valve stem 33 gradually closes port 31 and retards the building up of pressure in space 16. This building up is finally limited by the passage of liquid through the bleeder passageways 34.

The mechanism for accomplishing these results includes a guide bushing 35 threaded into extension 29 and forming a guide for the enlarged portion 36 of the needle valve stem 33. A compression spring 37 urges the stem 33 downwardly so that collar 38 rests against the inner end of bushing 35. However, the enlarged portion 36 of the needle valve stem 33 carries an adjustable contacting member 39, such as a screw. This contact member is adapted to contact with the bottom wall 40 of chamber 11, so that upon a predetermined downward movement the needle valve 33 is urged relatively upwardly, compressing spring 37 and causing the tapered end of the needle stem to enter into aperture 31. This position is shown in Figs. 1 and 4.

Since aperture 31 is gradually closed by this means in accordance with the downward movement of the closure structure 15, the downward movement of this closure structure is retarded and the valve is eased to closed position.

In order to open the main valve by upward movement of structure 15, fluid pressure is utilized acting underneath the closure member 25. Normally this fluid pressure is overcome by the fluid pressure existing in cylinder space 16; but when the cylinder space 16 is vented, the fluid pressure in chamber 11 is immediately effective to move the fluid closure structure to the position indicated in Fig. 5.

Venting of the cylinder space 16 to effect this result is accomplished by the aid of a pilot valve structure shown most clearly in Figs. 1, 4, 7, 10, and 11. This pilot valve structure includes a substantially cylindrical valve body member 41. This body member can be appropriately fastened as by the aid of a base 42 to the top of the cap member 18. The left hand end of body member 41 is closed by a cap 43 threaded therein. This cap also serves as a guide for the stem 44 of a valve closure member 45. This valve closure member, as shown most clearly in Figs. 10 and 11, is urged to closed position against a valve seat bushing 46 as by the aid of a compression spring 47. The valve seat bushing 46 is shown as threaded into an intermediate flange 48 in the valve body 41. The space 49 to the left of the seat 46 is in communication with the cylinder space 16 as by way of the passageway 50 (Figs. 1, 10, and 11). With closure 45 seated as shown in Fig. 11, the passageway 50 is closed and fluid pressure can effectively build up in the cylinder space 16 to hold the valve closure structure 15 in the closed position.

However, a mechanism is provided for moving the closure 45 to the left in order to unseat it from the bushing 46. When this occurs, liquid from cylinder chamber 16 can pass through the bushing 46 as well as through space 51 and past valve seat 52 into the chamber 53. This chamber is in communication with a passageway 54 that connects into the outlet conduit 4. Appropriate apertures of course are provided through the valve body 41 for completing passageways 50 and 54 into the interior of this valve body.

Valve seat 52 as shown most clearly in Figs. 10 and 11 is intended to cooperate with a valve closure member 55. This closure member is shown lifted from its seat in Figs. 10 and 11, but is shown as closed in Fig. 7. This closure member 55 is shown as carried by a rod or stem 56. This rod or stem passes through a packing gland structure 57 and has an extension 58 which can serve, when rod 56 is moved to the left, to unseat closure 45 from the valve seat 46. The same motion toward the left serves also to unseat closure 55 from seat 52 as by the aid of an enlargement or collar 59. Closure 55 furthermore has a series of through passageways 60 (Fig. 10) which is adapted to be closed by a collar 61 shown as integral with stem 56 and having a sloping face cooperating with the sloping face of closure 55. The arrangement is such that closure 55 is loosely mounted between the collars 59 and 61. Normally a compression spring 62 located inside of the valve body 41 acts against collar 63 on stem 56 urging it to the right so that all of the various valve closure members are seated. This is the position indicated in Fig. 7. Under such circumstances member 45 is seated on seat 46, collar 61 closes apertures 60 and closure 55 is seated on seat 52.

The fully opened position is shown in Fig. 10. In this position valve extension 58 of valve stem 56 is holding closure 45 away from seat 46. Collar 61 is no longer urged against the closure member 55; and closure member 55 is lifted from seat 52 by collar 59. The structure 52—55—60—61 located in chamber 51 controls the passage of liquid from conduit 64 to passageway 54. Conduit 64 as shown most clearly in Fig. 4 is in communication with chamber 11. Thus conduit 64, chamber 51, chamber 53, and passageway 54 forms a by-pass or a parallel path for liquid delivered through the meter 6. Accordingly, while valve closure 55 and collar 61 are in the open position of Fig. 10, liquid such as water or the like can still flow through the meter to outlet conduit 4, although at a diminished rate, even after the main valve closes. The main valve closes first by virtue of the fact that extension 58 recedes from closure 45, permitting this closure to seat in seat 46 and thereby closing the relief vent from cylinder chamber 16. This action takes place prior to the closure of the communication between conduit 64 and chamber 53. This intermediate position is shown in Fig. 11, the stem 56 having passed a sufficient distance toward the right to permit seating of closure 45, but not far enough to stop the flow of liquid through conduit 54.

In this way the termination of the delivery cycle is approached gradually. At first liquid passing through meter 6 can pass directly through the main valve structure to conduit 4 and some of it can also pass from chamber 11 through conduit 64, pilot valve 41 and conduit 4. This by-pass is left open as the main valve closes and is closed in two steps; that is, two steps which comprise the seating of closure member 55 on the seat 52 and then the seating of collar 61 in closure 55.

As is well understood, appropriate gaskets can be placed between the pilot valve body 41 and the member 18. Furthermore, as shown most clearly in Fig. 1, a coupling bushing 65 can be inserted in passageway 54 and can overlap the partition line between member 18 and flange 7' so that the gasket between these two parts is not subjected to any material fluid pressures at the interface. It is also to be noted that the cylinder bushing 17 for forming the main valve cylinder 16 accomplishes a like purpose.

As shown most clearly in Figs. 1 and 7, the valve body 41 has a slot 66 at its right hand end. The collar 63 extends into this slotted portion and has a horizontal slot extending therethrough indicated in Figs. 10 and 11 by reference character 67. This structure forms a convenient means for moving the valve stem 56 toward the left to initiate a cycle of liquid delivery operation. For example, a lever arm 68 (Figs. 1, 7, 9, 10, and 11) can be pivotally supported on member 18 as by the aid of a pivot screw 69 (Fig. 7). This lever extends through the slot 67 and has an operating end 70. In order to connect this lever arm 68 with the stem 56 a pin 71 extends through collar 63 and transversely to slot 67 therein. This pin also passes through a slot 72 in lever 68. It is apparent that when lever 68 is turned in a counterclockwise direction from the closed position of Fig. 7, it will exert a force on pin 72 and thereby urge the stem 56 toward the left.

This operation of lever 68 is accomplished by the manipulation of the handle 5 extending outside of the casing 1—2 and for this purpose a mechanism is provided which will be described shortly.

After the lever 68 has moved to its extreme counterclockwise position indicated in Fig. 10 against the action of springs 47 and 62, the various valve structures in the pilot valve are fully closed only after the meter 6 delivers a predetermined and adjustable amount of liquid. In order to hold the stem 56 in the open position of Fig. 10, use is made of a pair of abutments which move into engaging position automatically. These abutments are shown most clearly in Figs. 7, 10, 11, and 14. One abutment comprises the arm 73 pivoted on a stationary pivot 74 located in an appropriate portion of the apparatus. This arm while the pilot valve structure is closed (as shown in Fig. 7) is urged as by a tension spring 75 against the side of collar 63 which extends slightly beyond the right end of valve body 41. However, as soon as stem 56 moves toward the left by a sufficient distance, the arm 73 is pulled by spring 75 to contact with the end of the flat extension 76 formed on the end of the collar 63. This position is shown in Fig. 10 which shows the arm 73 in the valve holding position. The arm 73 is stopped against further clockwise rotation by a stationary abutment 77 which is also supported on a stationary part of the apparatus.

Thus valve stem 56 is held in the fully opened position of Fig. 10 until the arm 73 is moved downwardly and out of the path of the extension 76. However, in the meanwhile the upper abutment 78 also pivoted at 74, has moved to a position overlying arm 73 and against the stop 77. This is accomplished by the aid of a tension spring 79. This abutment or arm 78 is slightly shorter than arm 73 so that after arm 73 is moved out of the path of the extension 76, the stem 56 is not permitted to move to the fully closed position of Fig. 7. Instead it moves to the position shown in Fig. 11 against the end of the arm 77. In this intermediate position, valve closure 45 has been allowed to seat on valve seat 46 to cause the main valve structure 15—16 to close. The by-pass through conduit 64 is still open since closure 55 has not seated on seat 52. When arm 78 is depressed two stages of the closing of valve 55—52 are provided for by the aid of a notch 80 in the end of the arm 78. The extension 76 first moves into the notch 80, causing valve closures 55 and 61 to close partially; and finally to close completely when arm 78 is moved completely out of the path of extension 76. As shown in Fig. 7, the valves are completely closed and the cycle of delivery is completed.

The manner in which the meter 6 accomplishes this gradual closing will be described hereinafter. For the present it can be noted that there is a succession of steps near the closing of the delivery cycle reducing in steps the rate of delivery, so that injurious water-hammer or percussion is eliminated.

The manner in which lever 68 is moved to the left to initiate a liquid delivery cycle will now be described. This is best illustrated in connection with Figs. 4, 7, 9, and 10.

As shown most clearly in Fig. 4, the member 18 has a pair of bracket extensions 81—82 connected by a plate 83. On this plate there is pivotally supported an actuator structure 84, as by the aid of a pivot pin 85. This pivot pin 85 is joined to the actuator body 86 and extends through the plate 83. This actuator body is urged to rotate in a clockwise direction as by the aid of a tension spring 87. In the upper face of the body 86 there is a groove 88 in which is slidable the actuating member proper 89. Disposed over the member 89 is a cover plate 90, Figs. 4, 7 and 10. In Fig. 9 this cover plate is shown as removed. The cover plate also has a slot 91 through which pin 92 extends. This pin is fastened to the member 89 and a tension spring 93 connects pin 92 and a pin 94 on the cover member, to urge the member 89 resiliently to a retracted position shown in Fig. 7. There is a limit to the clockwise rotation of the actuator structure in response to the action of spring 87 as by the aid of a stop member 95.

The arrangement is such that the actuating structure can be rotated in a counterclockwise direction in order to store energy in spring 87 and when sufficient energy is stored, the member 89 is extended to its operating position as indicated in Fig. 10. This member 89 has a tip 96 adapted to engage with the cam surface 97 on lever 68 and on continued movement toward the left, it will urge lever 68 to the position indicated in Fig. 10. In this position the tip 96 passes by the end 70 of lever 68 and takes the position of Fig. 7.

In order to wind up this spring 87 and to extend actuating member 89, use is made of a pull rod 97' connected to the handle 5. This pull rod is guided on the bracket extensions 81 and 82 as well as by the cap member 98. Tension spring 99 is anchored to a stationary bracket 100 on cap 98 and at its other end it is anchored to the pull rod 97'. This tension spring 99 urges the pull rod 97' toward the right to assume the position shown in Fig. 7. Its movement toward the right is limited by a stop 101 fastened to the pull rod 97'. This pull rod has a shoulder 102 adapted to contact with the end of actuating member 89 when it is in the retracted position due to the action of spring 93.

It is apparent that the pulling of rod 97' toward the left and its engagement with the member 89 will cause a rotation in a counterclockwise direction of the rotatable member 86. An intermediate position is shown in Fig. 9. When pull rod 97' reaches a position toward the left sufficient to enable it to urge member 89 downwardly against the action of spring 93, the tip 96 of member 89 projects outwardly. Furthermore, when member 89 is moved downwardly, the pull rod 97' can no longer engage the actuating structure; spring 87 is free to expend its stored energy and to snap the actuating structure against stop 95. This action is like a trigger action, tip 96 acting on the cam surface 97 and finally passing over the end of the lever 68 past cam surface 70. The instant when tip 96 passes the end 70 is shown in the position of Fig. 10.

Since lever 68 after it is rotated, is held in the position shown in Fig. 10, it will not be in position to be contacted by tip 96 unless the pilot valves are closed; consequently, once these valves have been opened and a cycle of operation initiated, movement of pull rod 97' can have no further effect upon the mechanism until the cycle of operation is completed and the pilot valves have closed, returning lever 68 to its initial position.

If pull rod 97' is reciprocated in its guides it merely moves the actuating structure, but since tip 96 passes over the end 70 no action can take place (see Fig. 9). By this means it is assured that only complete cycles of operation can be performed, and no new cycle can be started until after the preceding cycle is completed.

There will not be described the mechanism by the aid of which the delivery of the liquid is stopped upon a predetermined quantity passing through conduit 4.

As shown most clearly in Figs. 1 and 3, the meter 6 has a shaft 103 which extends out of the casing of the meter and which is journaled in a cap member 104. This cap member 104 is fastened to the cover 8 of the meter and serves to support a stationary stub shaft 105.

The shaft 103 is journalled in the cap member 104 and carries a driving member such as a pinion 106. This pinion in turn drives a gear 107 which extends through the opening 104' provided in cap member 104 so as to enable pinion 106 and gear 107 to be in mesh. This gear 107 is appropriately fastened to a shaft journalled in a boss 108. This shaft carries a pinion 109 meshing in turn with a gear wheel 110. This gear wheel is fastened to a disc member 111 shown most clearly in Figs. 8, 11, 12, 13, and 15. The gear 110 can be fastened in any appropriate manner to the disc member as by the aid of screws 112 (Fig. 3). Both the gear 110 and disc 111 are freely rotatable on the stationary stub shaft 105. Accordingly, it is apparent that the angular motion of disc 111 is in accordance with the volume of liquid passing through the meter, shaft 103 being rotated by the passage of the liquid through the meter.

Figure 8:
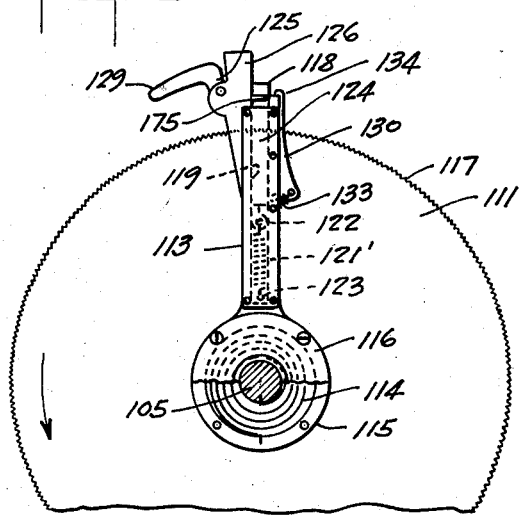
Fig. 8 is a sectional view taken along plane 8—8 of Fig. 1.
Figure 14:
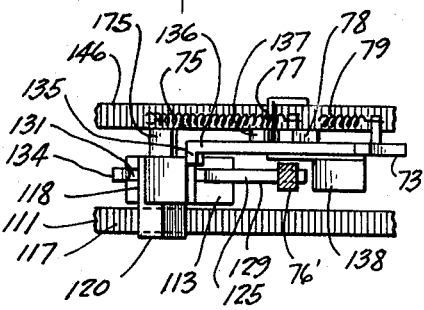
Fig. 14 is a detail view taken along the plane 14—14 of Fig. 11.

Disc 111 serves to actuate an arm 113 which includes a structure for actuating the abutment arms 73, 78. This arm 113 is shown in Figs. 1, 3, 8, 11, 12, 13, 14, and 15. This arm is adapted to be detachably engaged with the disc 111. Furthermore, the clutching between arm 113 and disc 111 is such that upon completion of the required volume of liquid the arm 113 is disengaged from the disc and is permitted to rotate back to its starting position. The mechanism for rotating the arm 113 back to its starting position includes a helical spring 114 (Fig. 3). The inner end of this spring is fastened to the stub shaft 105. The outer end thereof is attached to inner cylindrical surface of a counterbored boss 115 which forms a part of the arm 113 (Figs. 3 and 8). A cover plate 116 can be fastened over the hollow boss 115 in order to ensure that the spring 114 will be retained in place.

The mechanism for detachably engaging or clutching the disc 111 to the arm 113 includes a series of fine teeth 117 on the outer periphery of disc 111. These are adapted to be engaged by a pawl member 118. This member is shown to best advantage in Figs. 3, 11, 13, and 14. It is accommodated in a slot 119 in the upper face of arm 113 so as to be slidable therein. It has a downward extension 120 which extends over the edge of disc 111 and has inwardly directed teeth 121 (Fig. 13) adapted to engage with the teeth 117. Pawl member 118 is urged to engagement to disc 111 as by the aid of a tension spring 121'. This tension spring is also mounted in groove 119. In one end it engages in the eye 122 on the inner end of pawl 118. At the other end it is anchored to a pin 123 fastened in the bottom of groove 119. A cover plate 124 can be used to cover the groove 119.

Arm 113 is thus detachably clutched to the disc 111. However, it can be unclutched or disengaged as by the aid of a crank lever 125. This lever 125 is pivoted on an actuator extension 126 carried by arm 113. This is shown most clearly in Figs. 11, 12, and 13. One arm of the lever such as 127 (Fig. 11) extends into a slot 128 formed near the end of the pawl 118. Accordingly when lever 125 is rotated in a counterclockwise direction as viewed in Figs. 11, 12, and 15, the pawl 118 is moved radially outwardly against the tension of spring 121. The operating end of lever 125 is in the form of an arcuate arm 129 which is operated in a manner to be hereinafter described for releasing the arm 113 from disc 111.

Upon an outward movement of arm 118 sufficient to disengage it from the disc 111, it is retained in this disengaged position until it returns to the starting position. The means for retaining pawl 118 in disengaged position includes a catch 130 pivoted on a vertical axis on one side of slot 119. This catch 130 is accommodated in a slot 131 (Fig. 13) in the side of arm 113 and has extension 131' adapted to enter back of shoulder 132 and urged toward engaging position by the aid of a small tension spring 133 (Figs. 8 and 11). Accordingly upon actuation of lever arm 125 to release pawl 118 the catch is engaged and holds the arm 113 out of driving relation with disc 111. However, it is possible to free pawl 118 as by pressing upon the extension 134 of the catch 130. This, however, is not accomplished until after the arm 113 has rotated in a clockwise direction by a predetermined amount corresponding to such angular motion of disc 111 as represents the amount of liquid to be delivered in one cycle. The manner in which the release of catch 130 is accomplished will be described hereinafter.

Arm 113 in its counterclockwise motion carries the actuating extension 126 around with it. This actuator is adapted to cooperate with a downwardly directed extension 135 carried by an arcuate arm 136. This arcuate arm 136 is shown as being formed integrally with the abutment arm 73, the function of which has been heretofore described.

It is apparent that as arm 113 is moved by operation of the meter 6, it will toward the end of its travel urge arm 136 downwardly as viewed in Fig. 11 and force abutment arm 73 out of engagement with extension 76 of pilot valve stem 56. It will also permit this extension 76 to engage the upper arm 78. As heretofore stated, this causes the valve to assume the position of Fig. 11, whereby the main valve is closed but the by-pass through conduit 64 is still open. Accordingly the rate of travel of liquid is reduced and arm 113 moves more slowly. This urging of the arm 73 out of the path of extension 76 is against the resilience of spring 75.

Upon predetermined downward movement of arm 73 a pin abutment 137 carried by member 136, contacts the upper arm 78. The point of contact is illustrated in Fig. 11. Upon continued rotation of disc 111, arm 78 is urged downwardly to permit extension 76 to move to the notch 80; this reduces the flow of liquid through the by-pass 64. Shortly thereafter arm 78 is moved far enough down to permit extension 76 to move outwardly and close all the valves as shown in Fig. 7.

This outward movement toward the right of extension 76 also serves to trip the lever arm 129. This action is shown most clearly in Fig. 1. It is there seen that the extension 76 has an L-shaped projection 76' which moves to the right and contacts the arm 129 to move it inwardly. This frees the pawl 118 which is held in the freed position by catch 130.

Should the delivery of the water for some reason be continued as by failure of the valves, a safety trip is provided. This is shown most clearly in Figs. 11 and 14. It comprises an arcuate extension 138 formed integrally with the bracket 77. Upon continued movement of arm 113 past the valve closing position, this arcuate extension 138 engages the lower end of arm 129 and positively releases the pawl 118.

As soon as arm 113 is thus released, the helical spring 114 urges the arm 113 in a clockwise direction. This reverse rotation is limited by a stop 139 (Figs. 7, 12, 13, and 15). This stop has a surface 140 adapted as shown in Fig. 12 to contact with the right hand end of the catch 130. The pressure of spring 114 is sufficient to rotate catch 130 in a counterclockwise direction as viewed in Fig. 12 and pawl 118 is pulled into engagement with disc 111 by spring 121'.

The stop 139 is formed integrally as a part of the adjustable abutment 141 (Figs. 3, 7, 12, 13, and 15). This member 141 is slidable in a slot 142 in an arm 143. This arm 143 is rotatable over a hub 144 disposed on stub shaft 105 and carrying a stationary disc 146. This disc is held in stationary position as by the aid of a retaining key 147 (Fig. 3) engaging in slots cut in the end of the hub 144 as well as in the end of stub shaft 105, these slots extending diametrically across the hub and the shaft.

Arm 143 is carried by its hub 148 and is freely rotatable about the axis of shaft 105. It is, however, retained in any adjusted position by the aid of fine ratchet teeth 149 in the periphery of the stationary disc 146. These teeth are engaged between corresponding teeth 150 on the inner surface of the member 141. A cover member 151 extends over the slot 142 and is fastened as shown in Fig. 3 to the top surface of member 141. This cover member 151 has a slot 152 therein. Through this slot extends an anchor pin 153 fastened in the top side of arm 143. A corresponding anchor pin 154 is fastened to the cover 151. A tension spring 154' connects the two pins and resiliently urges the teeth 150 into engagement with the teeth 149 on stationary disc 146.

The degree of fineness of the teeth between the inter-engaging pawl 118 and disc 111 as well as the teeth 149 and 150 can be made such that it is possible to set the apparatus for delivering liquids very close to the desired quantity, the maximum error being equivalent to one-half the pitch between the teeth. About 500 or 600 such teeth can easily be formed and even a greater degree of fineness can be obtained. In this way an accuracy of about one-quarter of a degree in the angular positioning of the arms can be accomplished.

The apparatus is so arranged that the abutment surface 140 can be moved in either direction along the stationary disc 146 so as to determine the volume of liquid delivered in one cycle. It is apparent that the farther the arm 143 is moved in a clockwise direction, the greater the delivery of liquid must be before arm 113 arrives at its pilot valve controlling position for terminating the cycle. In order to permit setting of the angular position of arm 143, use is made of a bell crank lever 155 (Fig. 3). This arm is pivoted on a pin 156 carried in brackets 157 formed integral with hub 148 of arm 143. The vertical arm of bell-crank lever 155 engages an upwardly turned member 158 on cover member 151. Downward movement of the horizontally extending arm thus causes spring 154' to be stretched and the abutment member to be disengaged from the stationary disc 146.

The mechanism for accomplishing this purpose includes a thrust pin 160 mounted for sliding movement in a projection 161 of the hub 148. This thrust pin 160 is in engagement with the horizontal arm 159 and is adapted to be urged downwardly as by the aid of a handle member 162. This handle member 162 is pivoted in a slot in the projection 161 as on pin 163 and when handle 162 is raised, the end surface 164 of this handle urges thrust pin 160 downwardly. When this is accomplished, a pointer 165 can be grasped as by the aid of a finger hold 166 for moving the pointer and arm 143. The pointer 165 for this purpose is fastened to the extension 161 as by being provided with a split hub 167. Through this hub extends a clamp screw 168.

Pointer 165 is adapted to cooperate with a stationary scale 169 (Fig. 2) which can be marked in gallons, pints, quarts or the like. This stationary dial can be supported in the bottom of a tubular support 170 held in the cover 2. In normal operation a hinged locked cover 171 is disposed over the setting means and it can be held against tampering by the aid of a lock 172 in a well known way.

It is also advisable to provide a removable cover plate 173 fastened to the top of cover 2 to permit access to the pilot valve mechanism.

When cover 171 is opened, the pointer 165 can be moved to the desired position and handle 162 is returned to the horizontal position shown in Fig. 3 which causes the abutment 141 to be clutched to the stationary disc 146.

It will be obvious that after the completion of a cycle arms 113 and 143 will be close together as shown in Fig. 3 and the teeth on pawl arms 118 and 141 will be in engagement respectively with the teeth 117 on disc 111 and teeth 149 on disc 146. When it is desired to move arm 143 to a new setting, it will be necessary not only to disengage pawl 141 from teeth 149, but also pawl 118 from teeth 117; for otherwise it would not be possible to move arm 143 to reduce the quantity of liquid delivered (counterclockwise movement) at all on account of arm 113 being locked to disc 111; or if arm 143 was moved to increase the quantity of liquid delivered, arm 113 would retain its setting and cause the first batch of liquid to be short.

Accordingly there is provided a slot 177 in member 141 having an abutment surface 176 adapted to be engaged by a projection 175 on pawl member 118. This forms a definite setting for arm 113 in relation to the adjustable arm 143, and insures accuracy of measurement. The inner surface of slot 177 has an inclined portion 178, arranged to engage the upper corner of projection 175. The arrangement is such that when member 141 is moved to bring teeth 150 out of engagement with disc 146, projection 175 is confined between surfaces 176 and 178 and also moved outwardly, thus freeing pawl member 118 from teeth 117. The tension of spring 121' serves to hold the projection 175 in engagement with the surfaces 176 and 178, which insures that arms 113 and 143 will be moved simultaneously for the setting operation. After this setting is accomplished, open end 179 of slot 177 is so positioned and of such width that projection 175 may pass through it without hindrance as arm 113 is carried in a counterclockwise direction by rotation of wheel 111 in response to movement of the meter.

In the event of the meter stopping before the completion of a cycle, due to failure of the water supply for instance, or for any other reason, arm 113 will be in some position between its initial and tripping positions, with pawl arm 118 engaging teeth 117. If it is desired to return it to its original setting, trip lever 125 may be pressed manually to disengage pawl arm 118, and helical spring 121' will return it, as before. If, however, it is desired to reset arm 143 to some point necessitating the movement of arm 113 in counterclockwise direction, means must be provided for forcing projection 175 into slot 177, when member 141 is in its outer position with teeth 150 out of engagement with teeth 149. Such a condition is illustrated in Fig. 15. A cam 174 is formed on the forward side of member 141 so as to engage the inner surface of projection 175, which may be slightly bevelled, and force pawl member 118 outwardly and guide projection 175 into slot 177, where it will be forced against abutment surface 176 by the incline 178.

In order to make projection 175 move into the slot 177 formed in the member 141, it may be necessary to move the arm 143 rather rapidly to impart considerable momentum thereto.

It is thus apparent that movement of the arm 143, which determines the amount of liquid delivered in one cycle can be adjusted in either direction without interference from arm 113.

A short review of the mode of operation of the device can now be set forth.

In order to set the device into operation, the handle member 5 is pulled toward the left as viewed in Fig. 1. This swings the actuator member 89, causing it to move the pilot valve lever 68 upon a sufficient outward movement of the handle. This pilot lever 68 is then in the position shown in Fig. 10; arms 73 and 78 being in such a position as to hold the valve in the fully opened position. Liquid can then flow through the meter 6 to chamber 11, past valve structure 15, and also through by-pass pipe 64. This continues until arm 113 moves in a counterclockwise direction to move the abutments 73 and 78 successively out of the path of the projection 76 of the pilot valve stem 56. First the main valve is closed by virtue of the operation of closure 45 and then later the by-pass 64 is closed in two steps. Immediately thereupon the projection 76' trips lever arm 129 and arm 113 is free from disc 11. It is held in the freed position by the catch 130. The arm 113 then moves so as to urge the free end of catch 130 against abutment 139. When this occurs, the catch 130 is released and spring 121' pulls the pawl 118 in contact with the wheel 111. The apparatus is now in condition for starting a new cycle.

I claim:

1. In a device of the character described, liquid delivery means, a lever arm for initiating the operation of said means, by movement of the lever in one direction to a definite position, means whereby said lever is retained in said position until the completion of a delivery cycle, an actuator for said lever, an energy storing device for operating said actuator, and means for storing and releasing said energy to cause the actuator upon release of the energy to engage and to move the lever to its cycle initiating position, said position being out of the influence of the actuator.

2. In a device of the character described, liquid delivery means, a movable member for initiating the operation of said means, by movement of the member to a definite position, means for retaining said member in said position until the completion of a delivery cycle, and mechanism for moving said member to said position, comprising an actuator, an energy storing device, and means for storing and releasing the energy to cause the actuator to move said member to said position.

3. In a device of the character described, liquid delivery means, a movable member for initiating the operation of said means, by movement of the member to a definite position, means for retaining said member in said position until the completion of a delivery cycle, and a mechanism for moving said member to its cycle initiating position, said mechanism including means ensuring against partial movement of said member by said mechanism.

4. In a device of the character described, means for delivering a succession of measured quantities of liquid, said means including a main conduit and an auxiliary conduct of smaller capacity than the main conduit, through which liquid is delivered in parallel, and means for closing first the main conduit and then the auxiliary conduit.

5. In a device of the character described, means for delvering a succession of measured quantities of liquid, said means including a main valve, a pilot valve for controlling the main valve, said liquid being delivered partly through the main valve and partly through the pilot valve, and means for operating said pilot valve to close the main valve first, and then to close the pilot valve.

6. In a device of the character described, means for delivering a succession of measured quantities of liquid, said means including a pair of outlets through which liquid is delivered in parallel, means for first closing one of the outlets, and means for subsequently closing the other outlet in a plurality of stages.

7. In a device of the character described, a mechanism operating to deliver a measured quantity of liquid, a main valve having a closure, through which liquid is delivered, and a control pilot valve for the main valve, for controlling the liquid pressure on the closure to cause it to move to closed position, and an auxiliary valve operated toward closing position in accordance with the movement of the closure toward closing position, said auxiliary valve controlling the rate of passage of liquid through the closure.

8. In a device of the character described, a mechanism operating to deliver a measured quantity of liquid, a main valve having a closure, through which liquid is delivered, and a control pilot valve for the main valve, for controlling the liquid pressure on the closure to cause it to move to closed position, and an auxiliary valve operated toward closing position in accordance with the movement of the closure toward closing position, said auxiliary valve controlling the rate of passage of liquid through the closure, and said auxiliary valve having a plunger resiliently urged toward open position.

9. The combination as set forth in claim 7, in which the auxiliary valve is provided with bleeder passages for permitting liquid at all times to enter above the closure.

10. In a device of the character described, a mechanism operating to deliver a measured quantity of liquid, a main valve having a closure adapted to be operated by liquid pressure respectively on opposite sides to move it toward open and closed position, and through which liquid is delivered, a pilot valve for controlling said main valve, said pilot valve having a discharge port, as well as two intake ports, a valve closure controlling one intake port, said intake port being connected to the space on that side of the main valve closure in which liquid pressure is utilized to close the main valve, and a second valve closure controlling a by-pass around the main valve and through which by-pass some of the liquid is delivered by way of said outlet port, and means controlled by the mechanism for closing said valve closures.

11. In a device of the character described, a mechanism operating to deliver a measured quantity of liquid, a main valve having a closure adapted to be operated by liquid pressure respectively on opposite sides to move it toward open and closed position, and through which liquid is delivered, a pilot valve for controlling said main valve, said pilot valve having a discharge port, as well as two intake ports, a valve closure controlling one intake port, said intake port being connected to the space on that side of the main valve closure in which liquid pressure is utilized to close the main valve, and a second valve closure controlling a by-pass around the main valve and through which by-pass some of the liquid is delivered by way of said outlet port, and means controlled by the mechanism for closing said valve closures, said second pilot valve closure being closed after said first pilot valve closure.

12. In a liquid measuring device, a member movable in accordance with the quantity of liquid being delivered, a valve mechanism, and means for causing the valve mechanism to close upon predetermined travel of said member, comprising an actuator, a releasable catch mechanism for connecting the actuator to the member, said member moving said actuator to valve closing position, means urging said actuator in the opposite direction, and means responsive to the closing of the valve for releasing said actuator.

13. The combination as set forth in claim 12, with the addition of an adjustable stop for limiting the return movement of the actuator, and means associated with the stop for causing said actuator to be placed in driving relation with said member.

14. In a liquid measuring device, a member movable in accordance with the quantity of liquid being delivered, a valve mechanism, and means for causing the valve mechanism to close upon predetermined travel of said member, comprising an actuator, a releasable catch mechanism for connecting the actuator to the member, said member moving said actuator to valve closing position, means urging said actuator in the opposite direction, means for releasing said actuator from the member, and operated in response to the movement of the actuator to valve closing position, means for holding said actuator in released position, and a stop toward which the actuator is urged upon being released, said stop having provisions for causing said actuator to be placed in driving relation with the member when said actuator moves to the stop.

15. In a liquid measuring device, a member movable in accordance with the quantity of liquid being delivered, a valve mechanism, and means for causing the valve mechanism to close upon predetermined travel of said member, comprising an actuator, a releasable catch mechanism for connecting the actuator to the member, said member moving said actuator to valve closing position, means urging said actuator in the opposite direction, means responsive to the closing of the valve for releasing said actuator, and means for reengaging the actuator with the member upon a predetermined reverse movement.

16. In a liquid measuring device, a member movable in accordance with the quantity of liquid being delivered, a valve mechanism, and means for causing the valve mechanism to close upon predetermined travel of said member, comprising an actuator, a releasable catch mechanism for connecting the actuator to the member, said member moving said actuator to valve closing position, means urging said actuator in the opposite direction, means responsive to the closing of the valve for releasing said actuator, and means for reengaging the actuator with the member upon a predetermined reverse movement, comprising a releasably fixed arm, means for releasing said arm to adjust its position, and means placed in operative position when the arm is released, for causing the actuator to be released from the member and to move with the arm during adjustment movement of the arm.

17. In a liquid delivering device, means forming an inlet conduit, means forming an outlet conduit, and a valve interposed between the conduits, said valve having a main valve closure member, and a supplemental valve closure carried by said member and actuated toward closing position by the force acting to close the main valve closure.

18. In a liquid delivering device, means forming an inlet conduit, means forming an outlet conduit, and a valve interposed between the conduits, comprising means forming a main valve seat, a main valve closure movable toward said seat, said closure having an aperture therethrough, a supplemental valve closure adapted to vary the extent of opening of the aperture, and means whereby said valve closure is operated to vary said opening near the end of the closing movement of the main valve closure.

19. In a liquid delivering device, means forming an inlet conduit, means forming an outlet conduit, and a valve interposed between the conduits, comprising means forming a valve seat, a main valve closure movable toward said seat, means forming an auxiliary valve, and means whereby said auxiliary valve is gradually actuated to cause it to be nearly closed when the main closure closes.

20. In a liquid delivering device, means forming an inlet conduit, means forming an outlet conduit, means forming a valve closure seat between the conduits, a fluid pressure operated valve closure cooperating with said seat, and means whereby fluid pressure from the inlet conduit can be effective to close the valve, including an auxiliary valve having an auxiliary closure member and controlling an aperture in the main closure member, and urged to nearly closed position near the end of the closing movement of the main closure.

21. In a liquid delivering device, means forming an inlet conduit, means forming an outlet conduit, means forming a valve closure seat between the conduits, a fluid pressure operated valve closure cooperating with said seat, and means whereby fluid pressure from the inlet conduit can be effective to close the valve, including an auxiliary valve having an auxiliary closure member and controlling an aperture in the main closure member, and means yieldingly urging said auxiliary closure member toward open position, said auxiliary member having a portion adapted to contact with a stationary part of the apparatus near the end of the closing movement of the main valve closure, for causing it nearly to close the auxiliary valve upon closure of the main valve.

22. In a liquid delivering device, means forming an inlet conduit, means forming an outlet conduit, and a valve interposed between the conduits, said valve having a main valve closure member, and a supplemental valve closure carried by said member and actuated toward closing position by the force acting to close the main valve closure, comprising a needle valve cooperating with an aperture through the main valve closure.

23. In a liquid delivering device, means forming an inlet conduit, means forming an outlet conduit, and a valve interposed between the conduits, said valve having a main valve closure member, and a supplemental valve closure carried by said member and actuated toward closing position by the force acting to close the main valve closure, comprising a needle valve cooperating with an aperture through the main valve closure, and having a portion arranged to contact with a stationary part of the apparatus near the end of the closing movement of the main valve closure, for causing it to enter farther into the aperture as the main valve closure continues its movement.

24. The combination as set forth in claim 23, in which the aperture for the needle valve is so arranged that the needle valve does not completely close it upon completion of movement of the main valve closure.

25. In a liquid delivering device, a main valve, said main valve having means for urging it to closed position by fluid pressure, means forming a by-pass around the main valve means, and a pilot valve for controlling the pressure for operating the main valve as well as a separate means for controlling said by-pass.

26. In a liquid delivering device, a main valve, said main valve having means for urging it to closed position by fluid pressure, means forming a by-pass around the main valve, and a pilot valve for controlling the pressure for operating the main valve as well as for controlling said by-pass, said pilot valve including a pair of valve elements adapted to close in succession, the first to close causing the closing of the main valve, and the last to close controlling said by-pass.

27. In a device of the character described, a liquid delivery means, a member for initiating the operation of said means, means for retaining said member in operative position until the completion of a delivery cycle, and mechanism for moving said member to said position, comprising a movable actuator, said actuator being adapted to engage the member and to pass beyond it so that said actuator is ineffective to engage said member until said member returns to inactive position.

28. In a device of the character described, liquid delivery means, a member for initiating the operation of said means, and means for holding said member in operative position until the completion of a delivery cycle, comprising a movable abutment, means yieldingly holding said abutment in holding position, and means for moving said abutment out of operation to permit said member to return to inactive position.

29. In a device of the character described, liquid delivery means, a pilot valve controlling the operation of said means, said pilot valve having an auxiliary movable valve stem as well as resilient means for urging said stem toward closed position, means for moving said stem to open position, a plurality of movable means for holding said stem in open and in partly open position, and means for successively moving said plurality of means to permit closing said valve in a number of steps.

30. In a device of the character described, liquid delivery means, a main valve, means forming a by-pass around said main valve, a pilot valve controlling the operation of said valve, said pilot valve having an axially movable stem as well as resilient means for urging said stem toward valve closed position, said pilot valve also controlling the by-pass around the main valve, a plurality of movable means, one for holding said stem in valve opening position as well as in position to open the by-pass, and another for holding said stem in valve closing position as well as in position to close the by-pass, and means for successively moving said plurality of means out of holding relation to the stem.

31. In a device of the character described, liquid delivery means, means for controlling the operation of said delivery means, including a movable member as well as means urging said member to a position to terminate the cycle of delivery, movable means holding said movable member in liquid delivery position, and means moved in accordance with the quantity of liquid delivered, for releasing said controlling means at the end of the cycle, comprising a releasable member yieldingly urged to a cycle starting position, and released by movement of the controlling means to its cycle terminating position.

32. In a device of the character described, liquid delivery means, means for controlling the operation of said delivery means, including a movable member as well as means urging said member to a position to terminate the cycle of delivery, movable means holding said movable member in liquid delivery position, and means moved in accordance with the quantity of liquid delivered, for releasing said controlling means at the end of the cycle, comprising a releasable member yieldingly urged to a cycle starting position, and released by movement of the controlling means to its cycle terminating position, and a rigid member in the path of movement of the releasable member beyond its cycle terminating position, for positively releasing said member.

33. In a device of the character described, liquid delivery means, means for controlling the operation of said delivery means, including a movable member, and means moved in accordance with the quantity of liquid delivered, for causing said controlling means to terminate the cycle of delivery, comprising a rotatable member, a releasing arm detachably attached to said member, means urging said arm in a direction reverse to that of the rotatable member, an adjustable stop for said arm upon its reverse movement, means for adjusting said stop to adjust the amount of liquid to be delivered in each cycle, and means whereby said arm can be released from the rotatable member and coupled to the stop, for permitting said stop to be moved in either direction without hindrance from said arm.

34. The combination as set forth in claim 33, in which the means whereby said arm is released from the rotatable member includes a releasable catch for the adjustable stop, and an interlock between said catch and the arm.

FRANCIS WALTER GUIBERT.